United States Patent [19]

Takahashi

[11] Patent Number: 4,842,297
[45] Date of Patent: Jun. 27, 1989

[54] SUSPENSION SYSTEM OF MOTOR VEHICLES

[75] Inventor: Mitsuo Takahashi, Ota, Japan

[73] Assignee: Fuji Jukogyo Kabushiki Kaisha, Tokyo, Japan

[21] Appl. No.: 216,362

[22] Filed: Jul. 7, 1988

[30] Foreign Application Priority Data

Jul. 13, 1987 [JP] Japan ............... 62-174457

[51] Int. Cl.$^4$ .............................. B62D 7/20
[52] U.S. Cl. ................. 280/675; 280/661; 280/691
[58] Field of Search .......... 280/661, 675, 691, 696, 280/701

[56] References Cited

U.S. PATENT DOCUMENTS

| 4,202,563 | 5/1980 | Tattermusch | 280/675 |
| 4,373,743 | 2/1983 | Parsons, Jr. | 280/675 |
| 4,657,271 | 4/1987 | Salmon | 280/675 |
| 4,664,412 | 5/1987 | Matschinsky | 280/701 |
| 4,700,972 | 10/1987 | Young | 280/661 |

*Primary Examiner*—Kenneth R. Rice

[57] ABSTRACT

A wishbone type suspension system for a motor vehicle comprises upper and lower suspension arms each having one end pin-connected to the body of the motor vehicle and a knuckle member operatively connected to an axle of a wheel of the motor vehicle. The suspension system further comprises a connecting rod having one end connected to an intermediate part of one of the suspension arms and a bell crank lever having a first end pin-connected to the other end of the connecting rod, a second end pin-connected to one end of the knuckle member and a bent portion between these first and second ends. The bent portion is pin-connected to the other end of the other one of the suspension arms.

2 Claims, 2 Drawing Sheets

SUSPENSION SYSTEM OF MOTOR VEHICLES

BACKGROUND OF THE INVENTION

This invention relates to a suspension system of a motor vehicle and more particularly to a suspension system provided with improved two transverse rocker arms.

In the background art of this technical field there is known a wishbone type suspension system used as a front suspension for a motor vehicle such as that disclosed in Japanese Utility Model Laid-open Publication No. 26020/1978. In a wishbone type suspension system, as shown in FIG. 4, two rocker arms constituting an upper suspension arm 1 and a lower suspension arm 2 are swingably mounted to a member of the body of a motor vehicle at the inner ends thereof, i.e. lefthand ends as viewed in FIG. 4. The outer ends of the upper and lower suspension arms 1 and 2 are pin connected to the upper and lower ends of a knuckle member 3, respectively, thus constituting a trapezoidal four-bar linkage mechanism for supporting a wheel of the motor vehicle.

With the wishbone type suspension system of the character described above, the camber variation characteristics in the case of vertical swinging displacement of the suspension system can be changed by changing the lengths of the upper and lower suspension arms 1 and 2 or by changing the vertically pivoting positions of the suspension arms 1 and 2 to the body member of the motor vehicle, the positions being called "inner pivots" hereinafter. However, in actual design, there may arise a case wherein the lengths of the upper and lower suspension arms 1 and 2 are not desirably designed or the vertical positions of the inner pivots cannot be desirably changed because of the limited assembling space in the motor vehicle. For example, when the lengths of the upper and lower suspension arms 1 and 2 are made short, the camber variation becomes large, which creates problems such as excessive wear of whole tires, steering in stability and vibration transmission to the steering wheel of the motor vehicle.

SUMMARY OF THE INVENTION

An object of this invention is to substantially overcome the problem encountered in the conventional suspension system of a motor vehicle, and to provide an improved suspension system capable of reducing the camber variation characteristics and attaining a stable steering operation of the motor vehicle.

This and other objects can be achieved according to this invention by providing a suspension system of wishbone type of a motor vehicle comprising upper and lower suspension arms each having one ends secured to a body portion of the motor vehicle and a knuckle member connected to an axle of a wheel of the motor vehicle, the suspension system further comprising a connecting rod having one end connected to one of the upper and lower suspension arms, and a bell crank lever having a first arm end pin connected to the other end of the connecting rod, a second arm end pin connected to one end of the knuckle member, and a bent portion between the first and second arm end portions of the bell crank lever, the bent portion being pin-connected knuckle member in accordance with the swinging displacement of the suspension arms is made variable on the basis of the lever ratio of the bell crank lever, the angle formed between the first and second arm of the bell crank lever, and the connecting position of the connecting rod and the other suspension arm. Accordingly, the most suitable camber variation characteristics can be obtained by properly selecting and designing these factors without changing the lengths of the swing arms or inner pivoting positions of the swing arms.

Since the swing arms are operatively connected by the bell crank lever and the connecting rod as described above to impart a rotational displacement to the knuckle member when the suspension arms are swung, the most suitable camber variation characteristics required can be achieved by this invention.

Moreover, according to the construction of the suspension system of the character described above, no extra space is not required for incorporating the suspension system of this invention in the body of the motor vehicle, thus eliminating the limitation of the design of the conventional suspension system.

A preferred embodiment of this invention will be further described hereunder with reference to the accompanying drawings.

DESCRIPTION OF THE PREFERRED EMBODIMENT

A preferred embodiment of the suspension system according to this invention will be described hereunder with reference to FIGS. 1 and 2.

Figure 1:
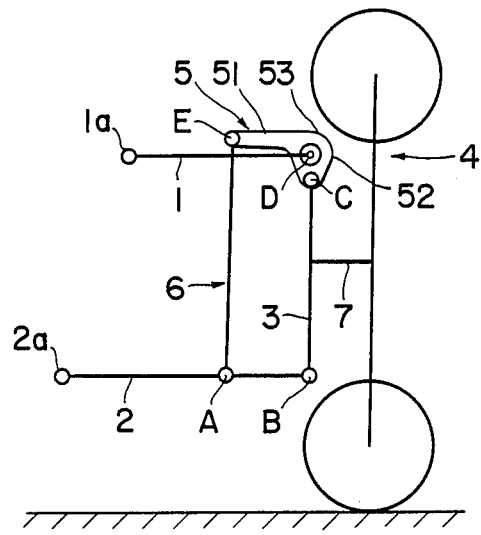
FIG. 1 is a schematic front view of a suspension system of a motor vehicle according to this invention.

Referring to FIG. 1, upper and lower suspension arms 1 and 2 are pivotally mounted on a body member of a motor vehicle or automobile, at inner ends thereof 1a, 2a. The suspension system includes a knuckle member 3 having a lower end pin-connected at B to the outer end of the lower suspension arm 2 and an upper end pin-connected of C to the end of one arm of a bell crank lever 5.

The bell crank lever 5 comprises a substantially horizontal arm 51 extending substantially parallelly to the upper suspension arm 1, a substantially vertical arm 52 extending downwardly and a bent crank portion 53 connecting these arms 51 and 52 to provide a substantially L-shaped shape. The bell crank lever 5 is pivotally connected at a pivot D of its crank portion 53 to the upper end of a substantially vertical connecting rod 6, the lower end of which is pin-connected to an intermediate point A on the lower arm 2. The suspension system is operatively connected to the axle of a wheel 4 of the motor vehicle through an axle 7 connected to the knuckle member 3. It is to be noted that the term "inner" and "outer" described hereinabove denote "lefthand" and "righthand" as viewed in FIG. 1, respectively, except in the case of the bell crank lever 5.

When the wheel 4 is displaced in the vertical direction as viewed in FIG. 1, the connecting point B between the outer end of the lower arm 2 and the lower end of the knuckle member 3, the connecting point C between the upper end of the knuckle member 3 and the outer end of the vertical arm 52 of the bell crank lever 5, and the pivoting point D between the outer end of the upper arm 1 and the bent portion 53 of the bell crank lever 5 are all vertically displaced by substantially the same amounts. The vertical displacement of the connecting point A between the lower end of the connecting rod 6 and the lower arm 2 is less than that of the connecting point B and hence less than that of the pivoting point D. The vertical displacement of the connecting point E between the upper end of the connecting rod 6 and the outer end of the horizontal arm 51 of the bell crank lever 5 is substantially equal to that of the connecting point A and hence less than that of the pivot point D.

Accordingly, when the wheel 4 is displaced upwardly as viewed in FIG. 1, the bell crank lever 5 is rotationally displaced in the counterclockwise direction, and, for example, as shown in FIG. 1, when the connecting point C is positioned below the pivot point D, the connecting point C is displaced outwardly, i.e. rightwardly as viewed in FIG. 1, due to the counterclockwise displacement of the bell crank lever 5, the angle of camber of the wheel 4 thereby being varied.

The variation characteristics of the camber angles are made variable in accordance with the lengths of the horizontal and vertical arms 51 and 52 of the bell crank lever 5, the ratio of these lengths, the angle of the bent portion 53, and the position of the connecting point A between the lower arm 2 and the lower end of the connecting rod 6. Accordingly, it is found that the most suitable camber variation characteristics can be realized by properly setting and selecting these factors without changing the lengths of the upper and lower suspension arms 1 and 2 and the vertical positions of the inner pivots.

Figure 2:
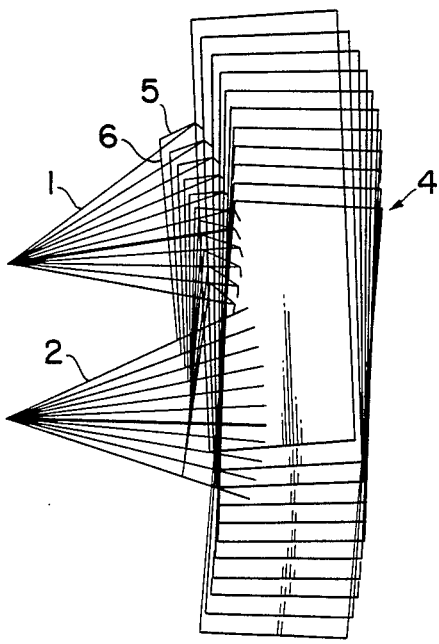
FIG. 2 is a geometric diagram for an explanation of the camber variation according to the wishbone type suspension system of this invention.
Figure 5:
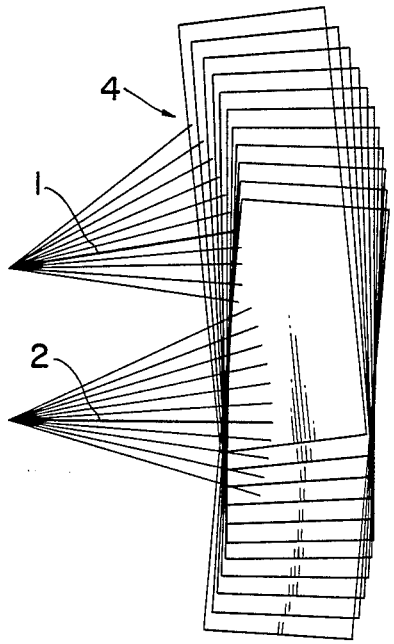
FIG. 5 is a geometric diagram similar to that of FIG. 2 according to the conventional suspension system of the type shown in FIG. 3.

FIG. 2 is a geometric diagram representing the displacement of the essential elements of the suspension system and the wheel according to this invention, and FIG. 5 is also a geometric diagram representing the displacement of the conventional wishbone type suspension system and the wheel having the same positional relationship between these elements as that shown in FIG. 2.

It will be easily understood from a comparison of these geometric displacements that the camber variation of FIG. 2 according to this invention is less than that shown in FIG. 5 representing the conventional type.

Figure 3:
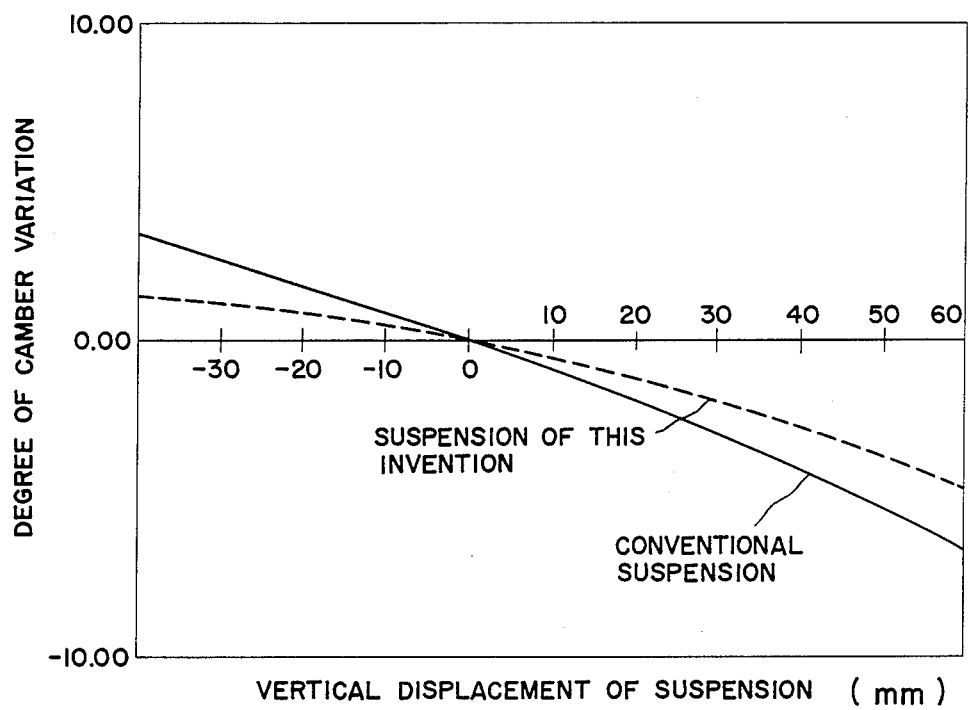
FIG. 3 is a graph showing a comparison of the camber variation characteristics according to the subject suspension system with that of the conventional suspension system.
Figure 4:
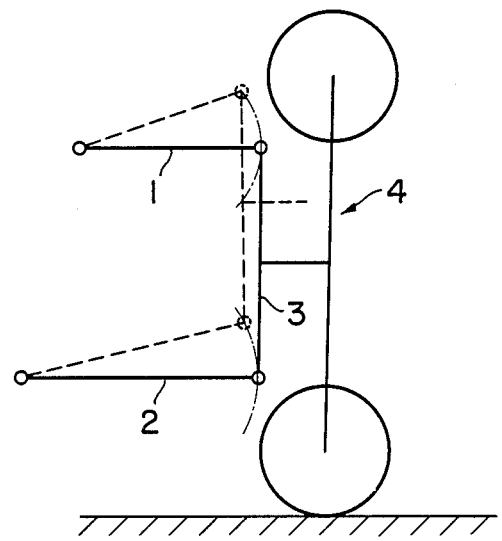
FIG. 4 is a schematic front view of a conventional wishbone type suspension system.

As described above, by suitably selecting or setting the respective factors of the bell crank lever 5 and the connecting rod 6, it becomes possible to vary the camber variation characteristics of the conventional wishbone type suspension system as designated by a solid line in the graph of FIG. 2 to the camber variation characteristics of the suspension system according to this invention as designated by a dotted line in the graph of FIG. 3 without elongating the lengths of the lower and upper suspension arms as in the conventional suspension system, whereby, according to this invention, a suspension system having an excellent performance capable of being assembled in a motor vehicle with no extra space therefor is provided.

It should be understood that this invention is not limited to the described, illustrated, preferred embodiment thereof and that various changes or modifications can be made without departing from the spirit and scope of the appended claims. For example, in the illustrated example, the bell crank lever 5 is operatively connected to the upper suspension arm 1, but the bell crank lever 5 may be connected to the lower suspension arm 2 and the upper end of the connecting rod 6 may be pin-connected to the upper arm 1.

What is claimed is:

1. A suspension system of wishbone type in a motor vehicle comprising:
   an upper suspension arm having one end pin-connected to a body portion of the motor vehicle;
   a lower suspension arm having one end pin-connected to the body portion of the motor vehicle;
   a knuckle member operatively connected to an axle of a wheel of the motor vehicle and operatively connected to the other ends of said upper and lower suspension arms, respectively;
   a connecting rod having one end pin-connected to one of said upper and lower suspension arms; and
   a bell crank lever having a first arm with an end pin-connected to the other end of said connecting rod, a second arm with an end pin-connected to one end of said knuckle member and a bent portions between said first and second arms of the bell crank lever, said bent portion being pin-connected to the other end of the other one of said upper and lower suspension arms.

2. The suspension system according to claim 1 wherein said bell crank lever comprises a horizontal arm having said end connected to said connecting rod, a vertical arm having said end connected to said knuckle member, and a central bent portion integrally connecting said horizontal and vertical arms.

* * * * *